United States Patent [19]

Taijonlahti et al.

[11] Patent Number: 4,658,682

[45] Date of Patent: Apr. 21, 1987

[54] METHOD AND DEVICE TO MOVE ONE OR MORE CLAMP ELEMENTS IN AN AUTOMATIC SHEET METAL MACHINING CENTER

[75] Inventors: Jorma Taijonlahti, Yli-Härmä; Mikko Lindström, Kauhava, both of Finland

[73] Assignee: Lillbackan Konepaja, Kauhava, Finland

[21] Appl. No.: 742,674

[22] Filed: Jun. 7, 1985

[30] Foreign Application Priority Data

Jun. 7, 1984 [FI] Finland .................................. 842297

[51] Int. Cl.[4] .............................................. B23Q 1/26
[52] U.S. Cl. ............................................ 83/13; 83/71; 83/409; 83/522; 269/58
[58] Field of Search ..................... 83/13, 71, 409, 410, 83/412, 414, 415, 522; 269/55, 56, 58

[56] References Cited

U.S. PATENT DOCUMENTS

| | | | |
|---|---|---|---|
| 3,448,645 | 6/1969 | Graf et al. ................................ | 83/71 |
| 3,902,389 | 9/1975 | Brown et al. ............................ | 83/71 |
| 4,471,676 | 9/1984 | Mason ..................................... | 83/71 X |
| 4,519,284 | 5/1985 | Hunter et al. ........................... | 83/71 X |
| 4,523,749 | 6/1985 | Kindgren et al. ....................... | 269/32 |

FOREIGN PATENT DOCUMENTS 2734804 3/1978 Fed. Rep. of Germany .

Primary Examiner—James M. Meister
Attorney, Agent, or Firm—Pollock, Vande Sande & Priddy

[57] ABSTRACT

An automatic sheet metal machining center has a frame, a work table attached immobile to it, a first carriage movable with regard to the frame, a second carriage attached to the first carriage and movable in a direction perpendicular to the path of the first carriage, and a stop pin in the frame. The stop pin is immobile in the directions of the paths of the carriages and is movable to upper and lower positions in a direction perpendicular to the plane of the work table. The position of a work piece, after having been placed on the work table, is determined in relation to the direction of the path of the second carriage, which has clamps for grasping the workpiece. The clamps are movable in the direction of the path of the second carriage and lockable thereto. According to a preprepared program, the respective positions of the clamps, with regard to the second carriage for grasping the workpiece, are automatically recognized and locked onto the second carriage with the aid of the stop pin.

11 Claims, 11 Drawing Figures

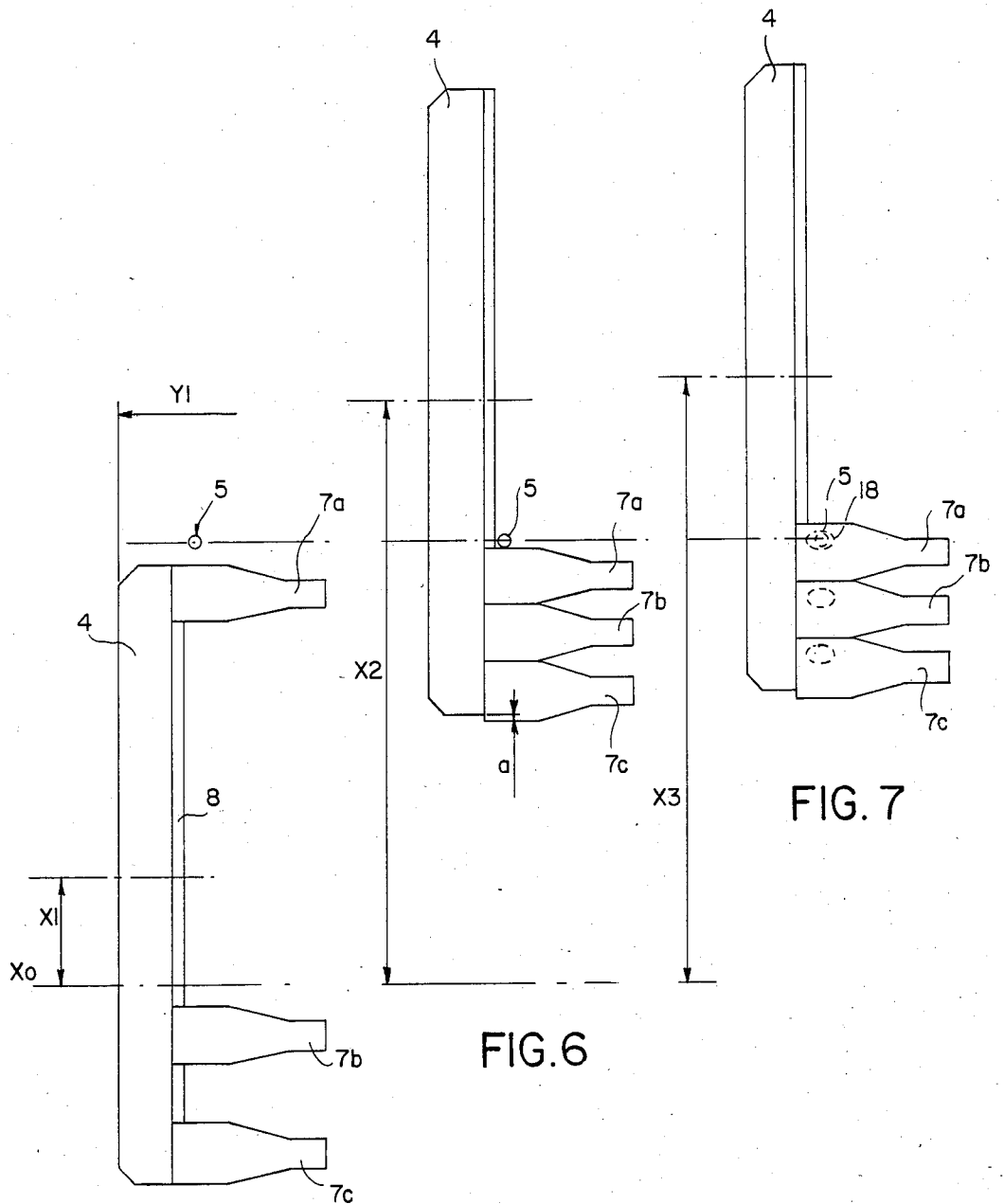

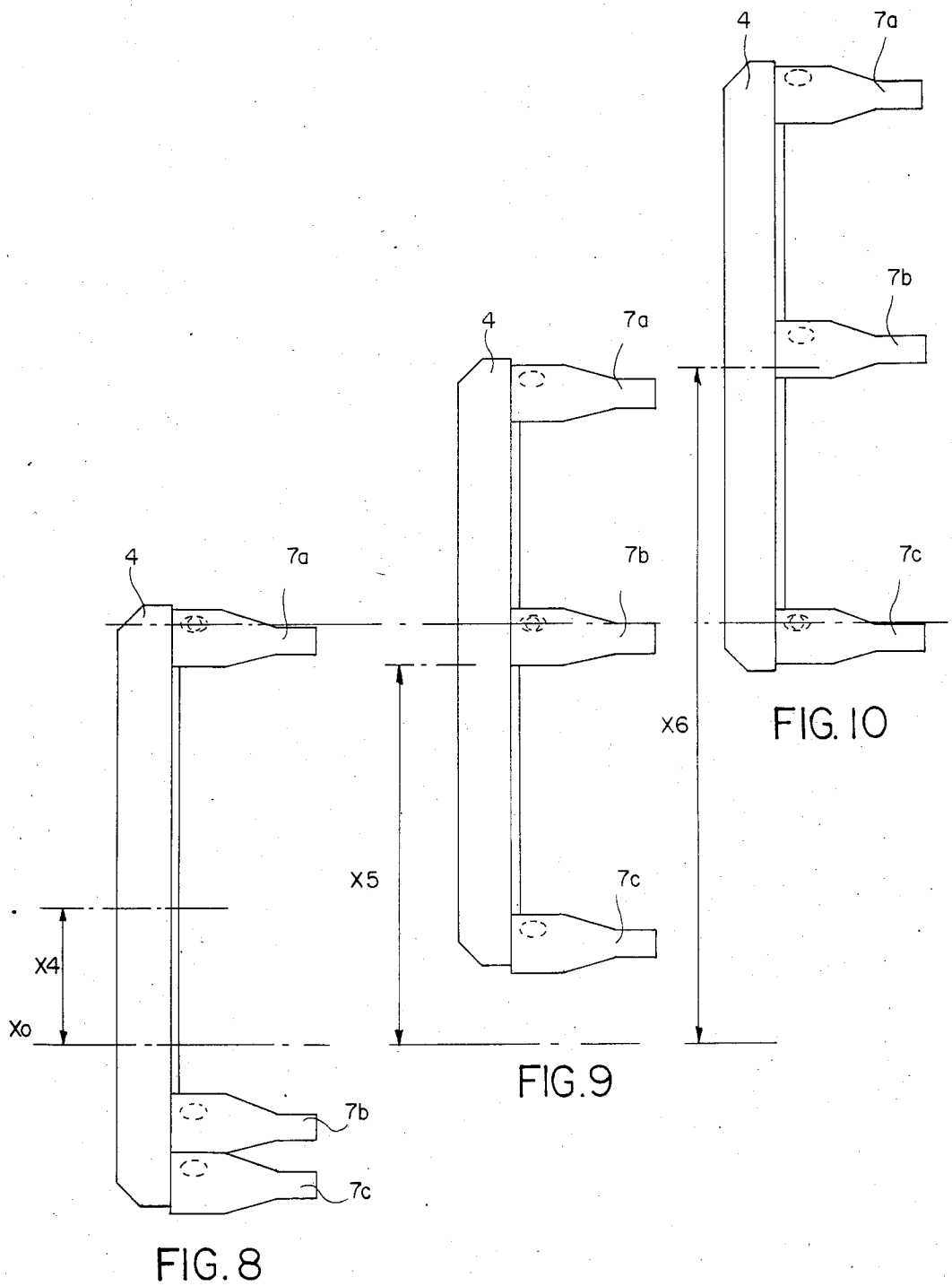

METHOD AND DEVICE TO MOVE ONE OR MORE CLAMP ELEMENTS IN AN AUTOMATIC SHEET METAL MACHINING CENTER

FIELD OF THE INVENTION

The present invention relates to a method to move one or more clamps from the first position to the second position in an automatic sheet metal machining center comprising: a frame; a work table attached immobile to it; the first carriage movable with regard to the frame; the second carriage attached to the first carriage and movable in the direction perpendicular to the path of the first carriage; and a stop pin in the frame, immobile in the directions of the paths of the carriages, and movable to the upper and lower positions in the direction perpendicular to the plane of the work table, with regard to which stop pin the position of the sheet to be machined on the work table is determined in the direction of the path of the second carriage; and the clamps of the sheet to be machined located in the second carriage the clamps being movable in the direction of the path of the second carriage along the guide in the second carriage and lockable thereto; and a control center.

BACKGROUND OF THE INVENTION

Such a sheet metal machining center is used to cut e.g. pieces of arbitrary shapes off a metal sheet. The first carriage, which may be called the carriage 'Y', moves along the guides in the frame with regard to the frame. This path may be called the direction of the Y-axis. The second carriage, which may be called the carriage 'X', moves along the guides in the first carriage in a direction perpendicular to the path of the first carriage. The path of the second carriage may be called the direction of the X-axis. The coordinates of the movement of the first carriage are calculated from a certain zero point on the frame, and the coordinates of the movement of the second carriage from a zero point in the memory of a CNC control center. Both carriages are moved mechanically with a driving mechanism working on the principle of screw/nut, pinion/rack or other such thing.

The sheet to be machined is fastened to the second carriage with clamps in the second carriage. The clamps may be operated e.g. mechanically or magnetically or in any other suitable way with which the sheet can be held immobile with regard to the second carriage. Thus, the sheet can be moved along the paths of both the second and the first carriages, i.e. within a sort of X/Y coordinates. The X-coordinates of the sheet are calculated from the top pin in the frame, the stop pin being movable to the upper and lower positions in the direction perpendicular to the plane of the work table. The Y-coordinates of the sheet are calculated from the front edge in the end of the clamp element.

A numeric data processor (CNC-control) controls the movements of the carriages to different positions and the operation of the whole machine. The CNC-control center is informed about the carriage position by e.g. a pulse sensor attached to the driving mechanism of the carriage or by a position sensor attached to the carriage. These devices and their operations are part of well-known techniques in the field and, hence, are not described here in more detail.

For machining of different sheets the positions of the clamps with regard to the second carriage must often be changed, because the dimensions of the sheet blooms vary or the sheet must also be machined at preceding locations of one or more clamps.

In the second carriage there is a guide along which the clamps can be moved in the direction of the path of the second carriage with regard to the second carriage. This way the positions of the clamps on the edge of the sheet can be rechosen considering the new circumstances. The clamps can be manually locked immobile in the second carriage and released from this locking.

The sheet is usually cut with a punching tool, e.g. a bayonet/pad tool. The sheet is moved with regard to the tool on the X/Y coordinates e.g. so that the bayonet follows the edge of the pattern to be cut. The bayonet can also punch separate holes in the sheet on spots chosen on the X/Y coordinates. The machine has a rotating table, or a so-called tool revolver, where different tools are kept and from where the machine automatically exchanges the needed tool for the machining position. The sheet can also be machined by a laser or plasma cut or with a chip cutting tool, such as a drill.

In the art, the repositioning of the clamp from the first position to the second position is done manually by detaching the clamp locking in regard to the carriage and moving the clamp to the second position and then locking the clamp there. To determine the position of the clamp with regard to the second carriage, there is a measuring scale in the second carriage and a mark line in the clamp. The readings of the measuring scale increase away from the stop pin. When the clamp or the clamps are fastened to the sheet while the sheet leans on the stop pin, the second carriage must be in such a position that its range of path in direction X suffices for the job, or in a so-called loading position. There can be several loading positions. The only prerequisite is that the path allowance of the second carriage suffices for the job. The basic loading position is the loading position where the zero point of the measuring scale of the second carriage coincides with the zero point of the X-coordinate of the sheet. The clamp positions in readings of the measuring scale are provided by the designer. The described method takes a relatively long time. This is a considerable drawback, because all through the set-up time the machine is idle. Since, however, the trend is toward shortening set-up times so that even very small production series might be economically processed in a sheet metal machining center, the length of the set-up time of the clamps has been a considerable drawback.

SUMMARY OF THE INVENTION

The object of the present invention is to shorten the set-up time of the clamps. According to the invention, this object is achieved so that, according to a preprepared program, the first position of the clamp to be moved is automatically recognized with regard to the second carriage, the movement of the clamp 7 with regard to the frame 1 is blocked and, by moving the second carriage 4, the clamp 7 is moved to the second position with regard to the second carriage 4.

The invention is based on the insight that by keeping the clamp in the first position immobile with regard to the frame, and by moving the second carriage with its own driving mechanism with regard to the clamp, the clamp is made to move with the second carriage to the second position where it then can be locked. The same procedure is repeated in regard to every clamp element to be moved.

According to an advantageous embodiment, the movement of the clamp with regard to the frame is blocked by bringing the stop pin in contact with the clamp.

According to another favourable embodiment, the movement of the clamp with regard to the frame is blocked by fastening the sheet to be machined, in a manner known as such, immobile with regard to the frame, with e.g. a pneumatic cylinder/piston-device in the frame, and by fastening the clamp to the sheet in a manner known as such.

According to a third favourable embodiment, the position of the clamp is recognized by moving it with the aid of the stop pin to a certain position with regard to the second carriage.

Further, according to an advantageous embodiment, the position of the clamp is recognized by identifying its position with e.g. an induction sensor whose position with regard to the frame is known. The induction sensor can be attached to e.g. the work table so that the clamps may move over it.

Still, according to a favourable embodiment, the position of the clamp is recognized from the memory of the control center.

Still, according to an advantageous embodiment, the preprepared program is ready to operate after it has been informed about the second positions, or the x-coordinates, of the clamps to be moved.

The invention also relates to the sheet metal machining center as described in the 'Introduction' of claim 1 for carrying out the method according to the invention.

The sheet metal machining center with which the method is carried out is mainly characterized by its automatic devices for locking the clamps to the second carriage and releasing them from this locking.

Further, according to a favourable embodiment, the clamps have been arranged to be locked and unlocked each one separately or a chosen number of them together.

Further, according to an advantageous embodiment, the clamp has a contact means to make contact between the clamp and the stop pin.

Still, according to a favourable embodiment, the contact means is a groove or a recess.

In the following, an advantageous embodiment of the invention is described in more detail referring to the enclosed drawings, where:

BRIEF DESCRIPTION OF THE DRAWINGS

FIG. 5 shows schematically the second carriage, and three clamps and the stop pin in the work table;

FIG. 6 shows the same parts after the first phase of moving;

FIG. 7 shows the same parts after the second phase of moving;

FIG. 8 shows the same parts after the third phase of moving;

FIG. 9 shows the same parts after the fourth phase of moving;

FIG. 10 shows the same parts after the fifth phase of moving, in their final positions with regard to the second carriage.

DETAILED DESCRIPTION OF THE INVENTION

Figure 1:
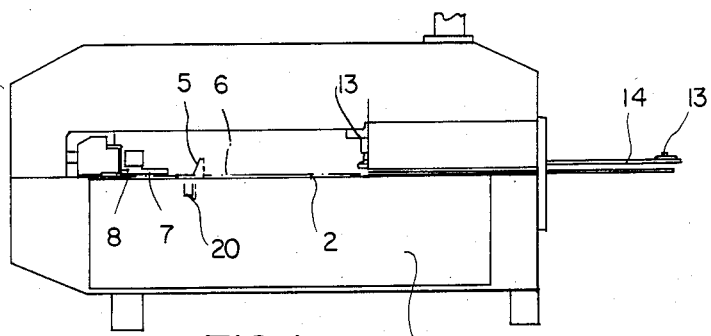
FIG. 1 is a side elevational view of the sheet metal machining center.
Figure 2:
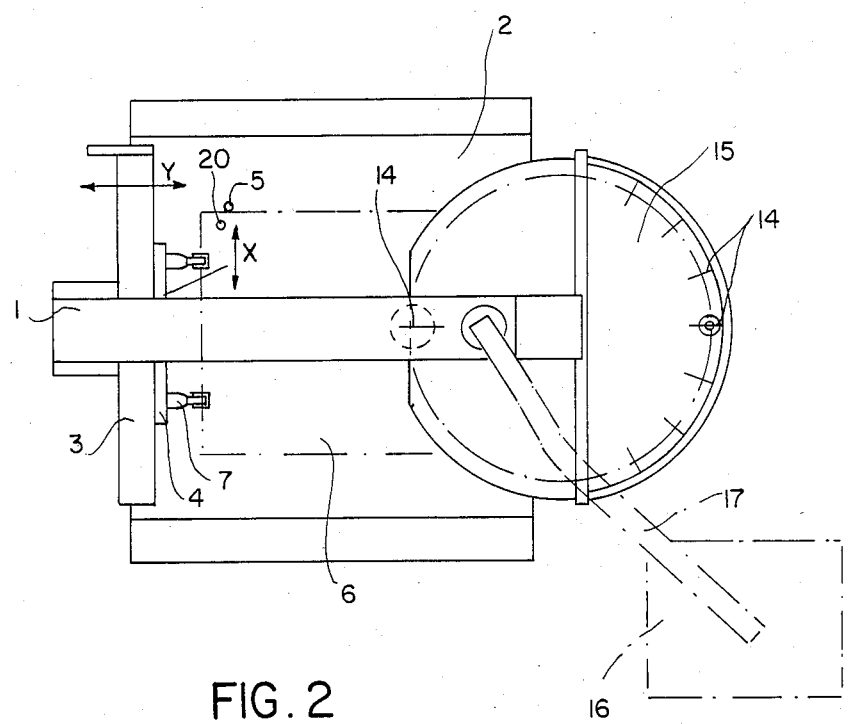
FIG. 2 is the plan view of the same sheet metal machining center.

FIGS. 1 to 4 show the main parts of the sheet metal machining center. The frame is indicated with reference number 1. The work table 2 is firmly attached to it. The first carriage 3 has been arranged to move in the direction Y with regard to the work table. The second carriage 4 has been arranged to move along the guide in the first carriage in the direction perpendicular to the path of the first carriage. The clamps 7 of the sheet to be machined 6 have been attached to the second carriage. These clamps can be moved in the direction of the path of the second carriage along the guide 8 in the second carriage.

Figure 3:
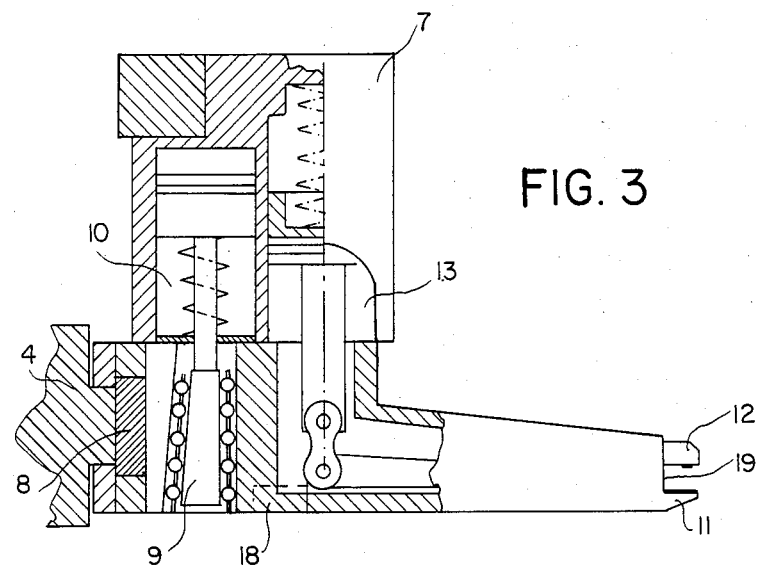
FIG. 3 is a partly sectional side elevational view of an embodiment of the sheet clamp.
Figure 4:
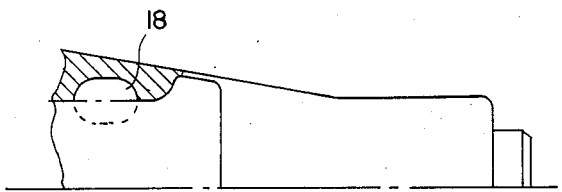
FIG. 4 is a fragmentary and partly sectional plan view of the same embodiment.

FIG. 3 shows one embodiment of the clamp 7, comprising jaws 11 and 12. The clamp has a wedge 9 which allows locking the clamp to the second carriage 4 with e.g. a pneumatic or hydraulic and spring-loaded work cylinder 10. The clamp clutches the sheet to be machined 6 with the lower 11 and upper 12 jaws of the clamp. In this example the lower jaw 11 is immobile and the upper jaw 12 can be vertically moved with a hydraulic and spring-loaded work cylinder 13 whose operation, the same as the operation of the corresponding work cylinder 10, is conventional; hence, they are not described in detail here. The sheet to be machined 6 is placed on the work table and then pushed in direction Y against the front edge 19 of the clamps 7 and in direction X against the stop pin 5 whereafter the jaws 11 and 12 clutch the sheet which then is locked immobile with regard to both the first and the second carriages in the so-called loading position. After this, the machining of the sheet takes place with the punching tool 14. Usually, there are several tools 14' in the sheet metal machining center in a so-called tool revolver 15 which usually is a table plate rotating around a vertical shaft. Exchanging a new tool to machining position 14 is automatic. All the machine functions described above are controlled by the CNC control center 16 from where cables 17 lead to different functioning parts of the machine.

FIGS. 5 to 11 shows the moving of the clamps 7a, 7b, and 7c in the second carriage 4 from their first positions to the second positions whose distances from the stop pin, while the second carriage is in the loading position, are A1, A2, and A3, respectively. In FIG. 5 the clamps are in their first positions which are, at this stage, unknown. The second carriage 4 has been driven in direction X to position X1 so chosen that all clamps are definitely on the same side of the stop pin 5, and in direction Y so that the stop pin is right at the clamps but not at the second carriage 4. The stop pin 5 is drive to its upper position. In the present description the positions X to X7 of the second carriage in the direction of the path of the carriage have been calculated from point X0 shown e.g. in FIG. 5.

FIG. 6 show the recognition of the clamp position with regard to the second carriage 4 and, simultaneously, to the stop pin 5. In this case, it takes place so that the second carriage 4 is driven slowly to position X2 which is so chosen that the stop pin 5 moves the clamps to one end of the carriage so that the edge more distant from the pin of the clamp 7c most distant from the pin comes some way outside the end more distant from the pin of the second carriage. Then we can be sure that there is no clearance between the clamps while the stop pin 5 is touching the clamp 7a next to the pin. Now, the CNC control is informed about the position of each clamp, although before this phase it was not.

After this, the stop pin is driven to its lower position and, according to FIG. 7, the second carriage 4 is driven to position X3 so chosen that the stop pin 5 will be at the groove 18 in the bottom of the clamp 7a. Then the stop pin 5 is driven to its upper position, bringing it into the groove 18. Now, the movement of clamp 7a with regard to the frame is blocked. The second carriage 4 is now driven to position X4, FIG. 8, so chosen that the clamp 7a moves to the second position with regard to the second carriage 4. Thereafter the stop pin 5 is driven to its lower position.

FIG. 9 shows how the clamp 7b, through phases described above, has been moved to its second position with regard to the second carriage by driving the second carriage in the last phase into position X5. The stop pin 5 is still at the groove 18.

FIG. 10 further shows how clamp 7c has been correspondingly moved to its second position with regard to the second carriage 4 by driving the second carriage in the last phase into position X6.

Before beginning the move from the first position, the clamp must be released from the locking to the second carriage. The clamp in the second position must be locked to the second carriage and released to move with regard to the frame. In a sheet metal machining center according to the present invention, these functions take place automatically.

Figure 11:
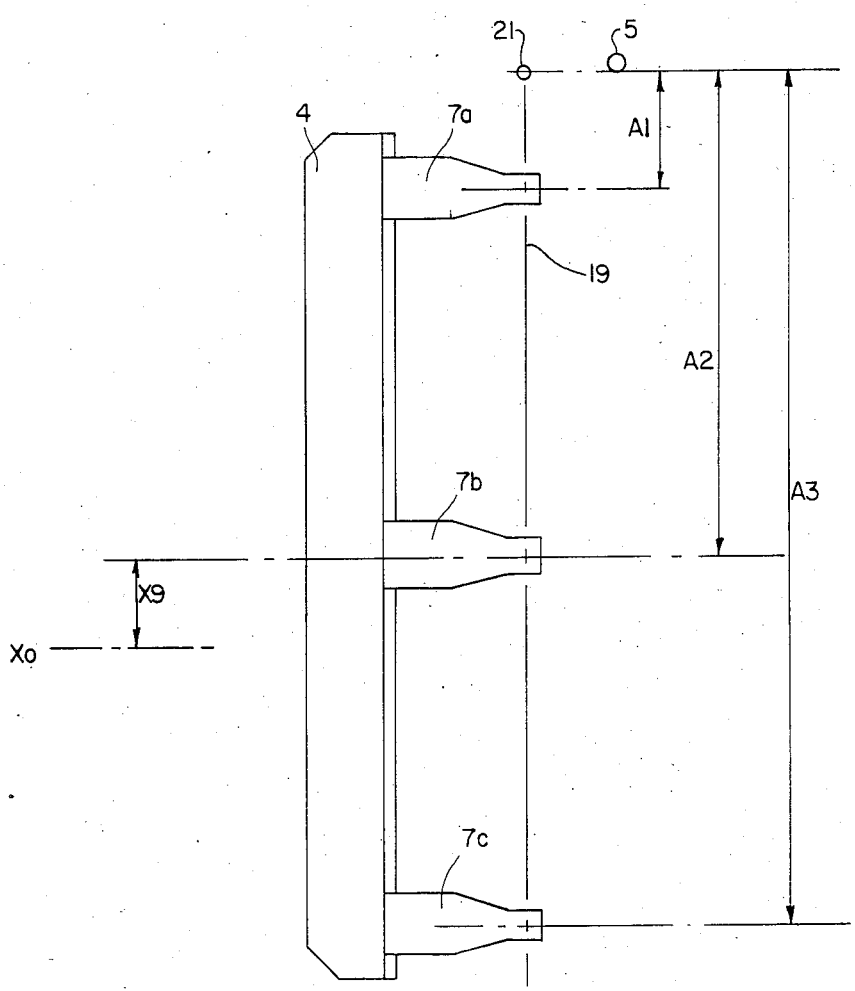
FIG. 11 shows the same parts while the second carriage is in the so-called loading position.

Still, FIG. 11 shows how the second carriage 4 has been driven to position X7 which is the loading position. Then the positions of clamps 7a, 7b, and 7c in the X coordinates of the sheet and with regard to the sheet 6 are those desired, or A1, A2, and A3. In this position the sheet is locked with the clamps 7 to the second carriage 4. The front edge of the clamps is indicated with number 19, and it determines the zero point of the Y coordinate of the sheet. The origin of the coordinates of the sheet, indicated with number 21, is thus determined.

The functions belonging to the moving of the clamps are compiled into their own preprogram added before the actual sheet machining program, and delivered to the CNC control center. In going from one case of machining to another only the second positions or X coordinates of the clamps need to be changed in the program. After this, the program is ready to function.

This description does not include the calculating of the above mentioned values of X and Y, because it is not actually a part of this invention but rather belongs to the general professional knowledge of the man skilled in the art.

We claim:

1. In an automatic sheet metal machining center having a frame, a work table attached immobile thereto, a first carriage movable with respect to the frame, a second carriage attached to the first carriage and movable in a direction perpendicular to the path of the first carriage, a plurality of clamps located at the second carriage, a stop pin in the frame, the stop pin being immobile in the directions of the paths of the carriages and movable to first and second positions with respect to the plane of the work table in a direction perpendicular to the plane of the work table, only one of the positions being effective for impeding movements on the plane of the work table, and a control center having a program, a method of moving at least one of the plurality of clamps from a first position to a second position for holding a to-be-machined workpiece and of determining a relative X-position for the workpiece, the method comprising the steps of:

moving the clamps in the direction of the path of the second carriage along a guide in the second carriage, the clamps being lockable to the guide;
   automatically recognizing the first position of the at least one clamp with regard to the second carriage;
   moving the stop pin to the one position with respect to the plane of the work table for impeding movements thereagainst on the plane of the work table;
   blocking the movement of the at least one clamp by bringing the same in contact with the stop pin;
   moving the second carriage for re-positioning the at least one clamp to the second position with regard to the second carriage; and
   moving the workpiece along the direction of the path of the second carriage until the same is abutted against the stop pin for establishing a zero X-position for the workpiece;
   whereby the X-position of the workpiece is determined in relation to the stop pin.

2. A method according to claim 1, wherein the recognizing step comprises:
   moving the at least one clamp with the aid of the stop pin for recognizing the position of the at least one clamp with regard to the second carriage.

3. A method according to claim 1, wherein the recognizing step comprises:
   identifying the position of the at least one clamp with an induction sensor having a known position relative to the frame.

4. A method according to claim 1, wherein the recognizing step comprises:
   recollecting from a memory of the control center the position of the at least one clamp.

5. A method according to claim 1, further comprising the step of:
   operating the program in the control center after learning of the second positions of the plurality of clamps to be moved.

6. In an automatic sheet metal machining center having a frame, a work table attached immobile thereto, a first carriage movable with respect to the frame, a second carriage attached to the first carriage and movable in a direction perpendicular to the path of the first carriage, a plurality of clamps located at the second carriage, the clamps being movable in the direction of the path of the second carriage along a guide thereat and lockable thereto, and a stop pin in the frame, the stop pin being immobile in the directions of the paths of the carriages and movable to first and second positions with respect to the plane of the work table in a direction perpendicular to the plane of the work table, only one of the positions being effective for impeding movements on the plane of the work table, a method of moving at least one of the plurality of clamps and of determining a relative X-position for a to-be-machined workpiece, the method comprising the steps of:

driving the second carriage for positioning the plurality of clamps to the same side of the stop pin;
   moving the stop pin to said one position for impeding movements thereagainst on the plane of the work table;

unlocking the clamps;

driving the second carriage toward the stop pin for bringing the at least one clamp in contact with the stop pin, thereby establishing a first position for the at least one clamp with respect to the second carriage;

moving the stop pin to its other position for removing any impediment to movement thereagainst on the plane of the work table;

driving the second carriage for aligning the at least one of the plurality of clamps with the stop pin;

engaging the at least one clamp with the stop pin by moving the stop pin to said one position;

driving the second carriage for moving the at least one clamp to a second position with respect to the second carriage;

disengaging the at least one clamp from the stop pin by moving the stop pin to its other position;

re-positioning the at least one clamp away from the stop pin;

moving the stop pin to said one position for impeding movements thereagainst on the plane of the work table; and moving the workpiece along the path of the second carriage until the same is in abutting relationship with the stop pin for establishing a zero X-position for the workpiece.

7. An automatic sheet metal machining center comprising:

a frame;

a work table attached immobile thereto;

a first carriage movable with regard to the frame;

a second carriage attached to the first carriage and movable in a direction perpendicular to the path of the first carriage;

a plurality of clamps for holding a to-be-machined workpiece located in the second carriage, the clamps being movable in the direction of the path of the second carriage along a guide in the second carriage and lockable thereto;

a stop pin in the frame, the stop pin being immobile in the directions of the paths of the carriages and movable to first and second positions with respect to the plane of the work table in a direction perpendicular to the plane of the work table, said stop pin in only one of its said positions being effective to determine the position of a workpiece on said work table;

a control center having a preprepared program;

whereby, in order to move an at least one of a plurality of clamps from a first position to a second position in accordance to the program, the first position of the at least one clamp is automatically recognized with regard to the second carriage, the movement of the clamp with regard to the frame being blocked by moving the stop pin to its said one position for contacting the clamp; and, by moving the second carriage, the at least one clamp is moved to the second position with regard to the second carriage; and wherein the X-position of the workpiece on the work table is determined by moving the workpiece along the direction of the path of the second carriage until the same is in abutting relation with the stop pin for establishing the zero position of the workpiece in the direction of the path of the second carriage, the stop pin having been moved to its said one position for impeding movements thereagainst on the plane of the work table.

8. A sheet metal machining center according to claim 7, wherein each of the plurality of clamps can be locked and released; and wherein a chosen number of the plurality of clamps can be locked and released together.

9. A sheet metal maching center according to claim 7, wherein each of the plurality of clamps has a contact means to make contact between the clamp and the stop pin.

10. A sheet metal machining center according to claim 9, wherein the contact means comprises a groove in the bottom of the clamp.

11. A sheet metal machining center according to claim 9, wherein the contact means comprises a recess in the bottom of the clamp.

* * * * *